United States Patent
Pai (10) Patent No.: US 10,018,294 B2
(45) Date of Patent: Jul. 10, 2018

(54) QUICK CONNECTOR WITH SAFELY LOCKING FUNCTION

(71) Applicant: Kuei-Sen Pai, Xiushui Township, Changhua County (TW)

(72) Inventor: Kuei-Sen Pai, Xiushui Township, Changhua County (TW)

( * ) Notice: Subject to any disclaimer, the term of this patent is extended or adjusted under 35 U.S.C. 154(b) by 178 days.

(21) Appl. No.: 15/187,832

(22) Filed: Jun. 21, 2016

(65) Prior Publication Data
US 2017/0363238 A1 Dec. 21, 2017

(51) Int. Cl.
*F16L 37/23* (2006.01)

(52) U.S. Cl.
CPC .................................... *F16L 37/23* (2013.01)

(58) Field of Classification Search
CPC ... F16L 27/0824; F16L 27/0828; F16L 37/23; F16L 37/138; F16L 37/12
USPC ........................... 285/86, 276, 277, 315, 316
See application file for complete search history.

(56) References Cited

U.S. PATENT DOCUMENTS

| 3,422,390 A * | 1/1969 | Tucker .......................... 285/277 |
| 4,211,253 A * | 7/1980 | Ekman .................... F16L 37/23 |
| 6,412,828 B1 * | 7/2002 | Lacroix ................... F16L 37/23 |
| | | 285/316 X |
| 6,908,118 B2 * | 6/2005 | Fumioka ................ F16L 37/23 |
| | | 285/277 |
| 7,213,845 B2 * | 5/2007 | Sato ........................ F16L 37/23 |
| | | 285/315 |

* cited by examiner

*Primary Examiner* — Greg Binda
*Assistant Examiner* — Zachary T Dragicevich
(74) *Attorney, Agent, or Firm* — Alan D. Kamrath; Kamrath IP Lawfirm, P.A.

(57) ABSTRACT

A quick connector includes a connector body, a spring, a plurality of positioning balls, a push ring, a movable sleeve, a snap ring, and a locking structure. When a coupling is inserted into the connector body, the push ring is pushed the spring to press the positioning balls which press the coupling so that the coupling is locked onto the connector body. The movable sleeve is driven to return the push ring to release the coupling from the positioning balls. Thus, the movable sleeve is locked by the locking structure and cannot be moved any more so that the movable sleeve will not be driven inadvertently due to an external force and can press the positioning balls to lock the coupling so as to prevent the coupling from being detached from the connector body.

7 Claims, 11 Drawing Sheets

QUICK CONNECTOR WITH SAFELY LOCKING FUNCTION

BACKGROUND OF THE INVENTION

1. Field of the Invention

The present invention relates to a quick connector.

2. Description of the Related Art

A conventional quick connector comprises a connector body, a spring, a plurality of positioning balls, a limit member, and a movable sleeve. The connector body has an interior provided with a chamber and has a periphery provided with a plurality of receiving holes connected to the chamber. The spring is mounted on the connector body and is biased between the connector body and the limit member. The positioning balls are received in the receiving holes of the connector body. The limit member is mounted on the connector body and is pushed by an elastic force of the spring to press the positioning balls. The movable sleeve is mounted on the connector body and rests on the limit member. When a coupling is to be connected to the connector body, the movable sleeve is driven by a force to push the limit member and compress the spring, so as to release the positioning balls from the limit member, to allow entrance of the coupling into the chamber of the connector body. After the force disappears, the limit member is pushed by the restoring force of the spring to press the positioning balls into an annular groove of the coupling so as to lock the coupling onto the connector body. However, the movable sleeve is not locked and can be moved freely, so that when the movable sleeve is driven inadvertently due to an external force, the positioning balls are released from the limit member, and the coupling can be detached from the connector body, thereby causing danger to the user.

BRIEF SUMMARY OF THE INVENTION

The primary objective of the present invention is to provide a quick connector with a safely locking function.

In accordance with the present invention, there is provided a quick connector comprising a connector body, a spring, a plurality of positioning balls, a push ring, a movable sleeve, a snap ring, and a locking structure. The connector body has an interior provided with a chamber. The connector body has a first end provided with a mounting portion and a second end provided with an extension. The extension of the connector body has a peripheral face provided with an annular groove, a plurality of receiving holes and a plurality of positioning ribs. The receiving holes of the connector body are connected to the chamber. The spring is mounted on the extension of the connector body and is biased between the extension of the connector body and the push ring. The positioning balls are received in the receiving holes of the connector body. The push ring has an interior provided with a mounting hole mounted on the extension of the connector body. The mounting hole of the push ring has a peripheral wall provided with a plurality of positioning channels corresponding to the positioning ribs of the connector body. The push ring is pushed by an elastic force of the spring to press the positioning balls. The movable sleeve is mounted on the extension of the connector body. The movable sleeve has an inner wall provided with a first mounting bore, a stop flange and a second mounting bore, with the stop flange being arranged between the first mounting bore and the second mounting bore. The first mounting bore of the movable sleeve receives the spring and the push ring. The snap ring is mounted on the extension of the connector body and retained by the annular groove of the connector body. The snap ring is received in the second mounting bore of the movable sleeve and abuts the stop flange of the movable sleeve. The locking structure includes a switching ring mounted on the extension of the connector body and two opposite ratchet modules mounted in a peripheral wall of the first mounting bore of the movable sleeve. The switching ring of the locking structure has an inner wall provided with a plurality of positioning recesses corresponding to peripheral corners of the mounting portion of the connector body, so that the switching ring of the locking structure is limited on the connector body. The switching ring of the locking structure has an outer wall provided with two opposite guide rails. Each of the two opposite ratchet modules of the locking structure is provided with a stop zone and a free zone. The stop zone of each of the two opposite ratchet modules is provided a toothed braking portion. The free zone of each of the two opposite ratchet modules is connected to the stop zone and has an elongate shape.

According to the primary advantage of the present invention, the movable sleeve is locked by the locking structure and cannot be moved any more so that the movable sleeve will not be driven inadvertently due to an external force and can press the positioning balls to lock the coupling solidly and stably so as to prevent the coupling from being detached from the connector body and to enhance the working safety of the quick connector.

According to another advantage of the present invention, the user only needs to rotate the movable sleeve to unlock the movable sleeve from the locking structure so that the movable sleeve is released to detach the coupling from the connector body easily and quickly, thereby saving the user's time and energy.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-7, a quick connector in accordance with the preferred embodiment of the present invention comprises a connector body 1, a spring 2, a plurality of positioning balls 3, a push ring 4, a movable sleeve 5, a snap ring 6, and a locking structure 7.

Figure 1:
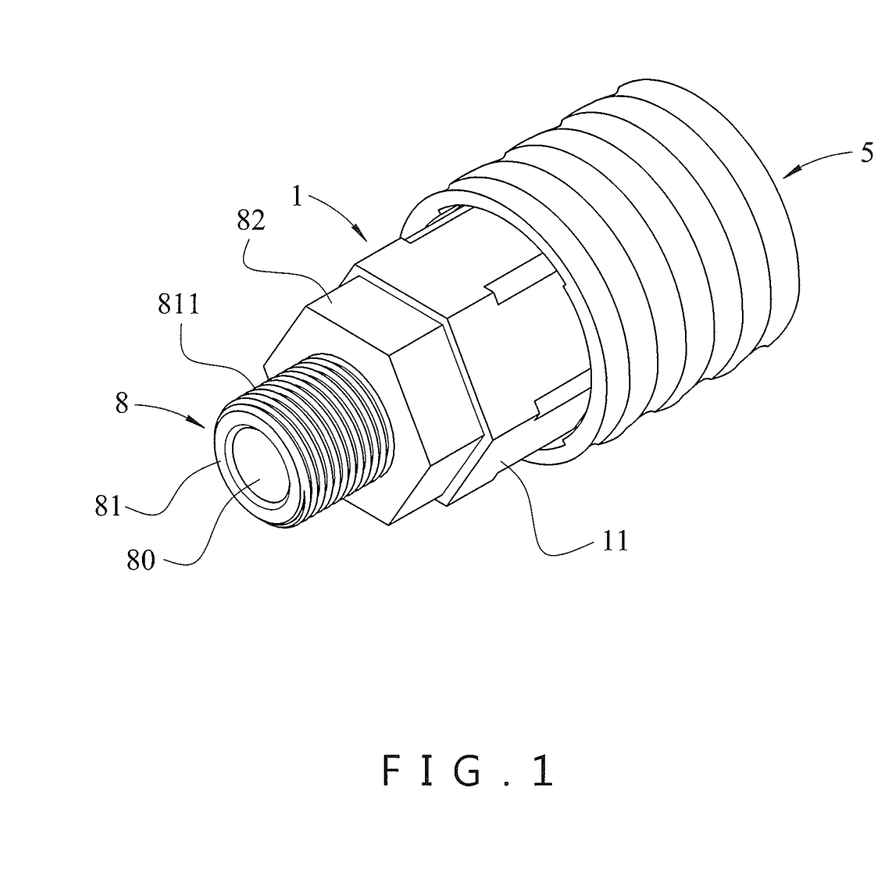
FIG. 1 is a perspective view of a quick connector in accordance with the preferred embodiment of the present invention.
Figure 2:
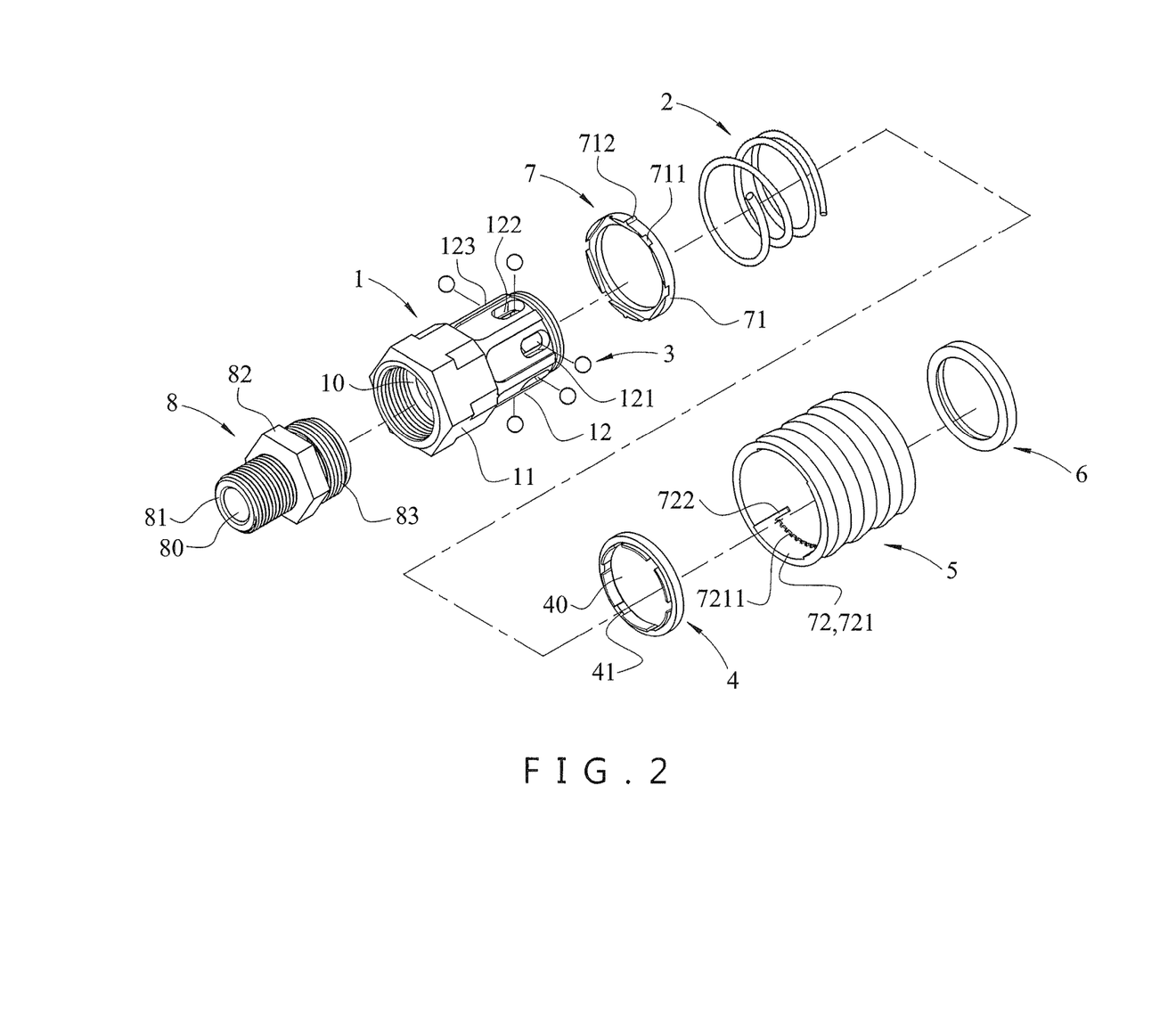
FIG. 2 is an exploded perspective view of the quick connector as shown in FIG. 1.
Figure 7:
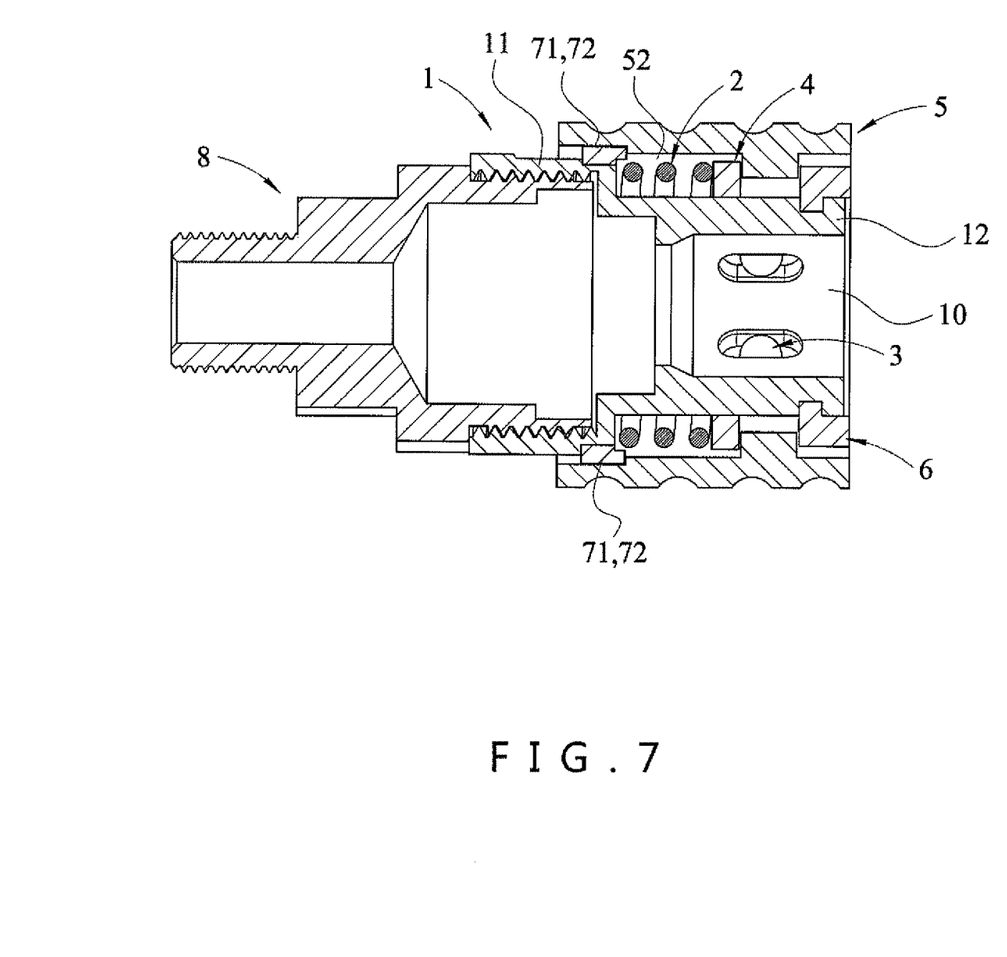
FIG. 7 is a cross-sectional view of the quick connector as shown in FIG. 1.

The connector body 1 is made of metallic or plastic material and has an interior provided with a chamber 10 for mounting an external air input device (not shown). The chamber 10 of the connector body 1 has a stepped shape and extends through a whole length of the connector body 1. The connector body 1 has a first end provided with a mounting portion 11 and a second end provided with an extension 12. The mounting portion 11 of the connector body 1 has a polygonal shape. The extension 12 of the connector body 1 has a peripheral face provided with an annular groove 121, a plurality of receiving holes 122 and a plurality of positioning ribs 123. The receiving holes 122 of the connector body 1 are connected to the chamber 10. The positioning ribs 123 of the connector body 1 are located between the receiving holes 122.

The spring 2 is made of metallic material. The spring 2 is mounted on the extension 12 of the connector body 1 and is biased between the extension 12 of the connector body 1 and the push ring 4.

The positioning balls 3 are received in the receiving holes 122 of the connector body 1. Each of the positioning balls 3 is made of metallic material. Preferably, each of the positioning balls 3 is a steel ball. Each of the receiving holes 122 of the connector body 1 has a stepped shape to prevent the positioning balls 3 from falling into the chamber 10 of the connector body 1.

The push ring 4 is made of metallic or plastic material and has an interior provided with a mounting hole 40 mounted on the extension 12 of the connector body 1. The mounting hole 40 of the push ring 4 has a peripheral wall provided with a plurality of positioning channels 41 corresponding to the positioning ribs 123 of the connector body 1, so that the push ring 4 is limited on the extension 12 of the connector body 1. Thus, the push ring 4 is movable axially on and non-rotatable relative to the extension 12 of the connector body 1. The push ring 4 is pushed by an elastic force of the spring 2 to press the positioning balls 3 so as to prevent the positioning balls 3 from being detached from the push ring 4.

Figure 3:
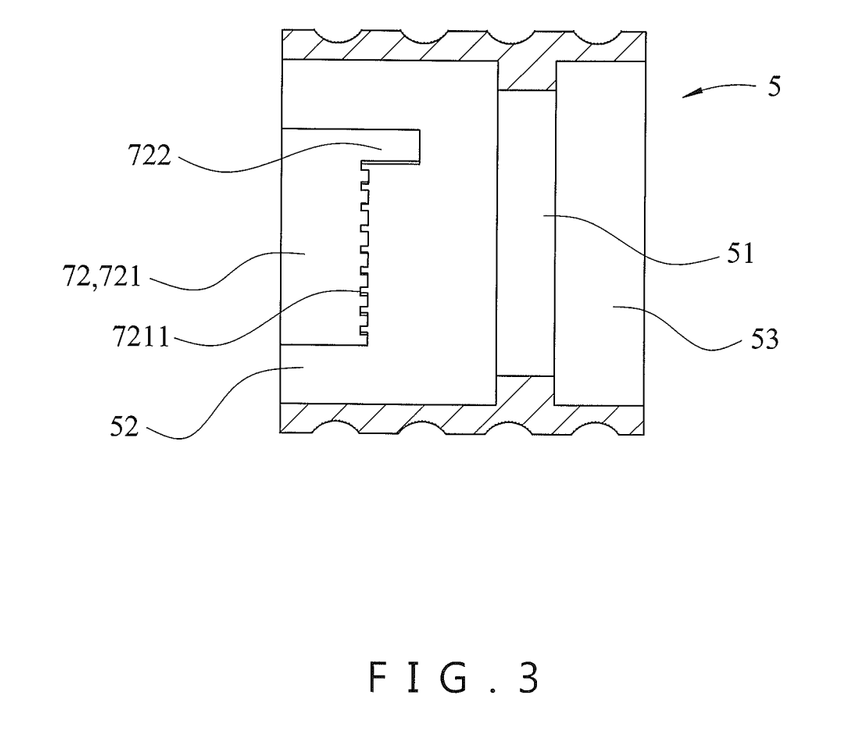
FIG. 3 is a cross-sectional view of a movable sleeve of the quick connector in accordance with the preferred embodiment of the present invention.

The movable sleeve 5 is made of metallic or plastic material and is mounted on the extension 12 of the connector body 1. The movable sleeve 5 has a hollow shape and has an inner wall provided with a first mounting bore 52, a stop flange 51 and a second mounting bore 53, with the stop flange 51 being arranged between the first mounting bore 52 and the second mounting bore 53. The first mounting bore 52 of the movable sleeve 5 receives the spring 2 and the push ring 4.

The snap ring 6 is made of plastic material. The snap ring 6 is mounted on the extension 12 of the connector body 1 and retained by the annular groove 121 of the connector body 1. The snap ring 6 is received in the second mounting bore 53 of the movable sleeve 5 and abuts the stop flange 51 of the movable sleeve 5, with the stop flange 51 of the movable sleeve 5 being located between the push ring 4 and the snap ring 6. The spring 2 pushes the push ring 4 which pushes the stop flange 51 of the movable sleeve 5 to abut the snap ring 6 which prevents the movable sleeve 5 from being detached from the connector body 1.

The locking structure 7 is made of metallic or plastic material and includes a switching ring 71 mounted on the extension 12 of the connector body 1 and two opposite ratchet modules 72 mounted in a peripheral wall of the first mounting bore 52 of the movable sleeve 5. The switching ring 71 of the locking structure 7 has an inner wall provided with a plurality of positioning recesses 711 corresponding to peripheral corners of the mounting portion 11 of the connector body 1, so that the switching ring 71 of the locking structure 7 is limited on the connector body 1. The switching ring 71 of the locking structure 7 has an outer wall provided with two opposite guide rails 712. Each of the two opposite ratchet modules 72 of the locking structure 7 is provided with a stop zone 721 and a free zone 722. The stop zone 721 of each of the two opposite ratchet modules 72 is provided a toothed braking portion 7211. The free zone 722 of each of the two opposite ratchet modules 72 is connected to the stop zone 721 and has an elongate shape.

Figure 4:
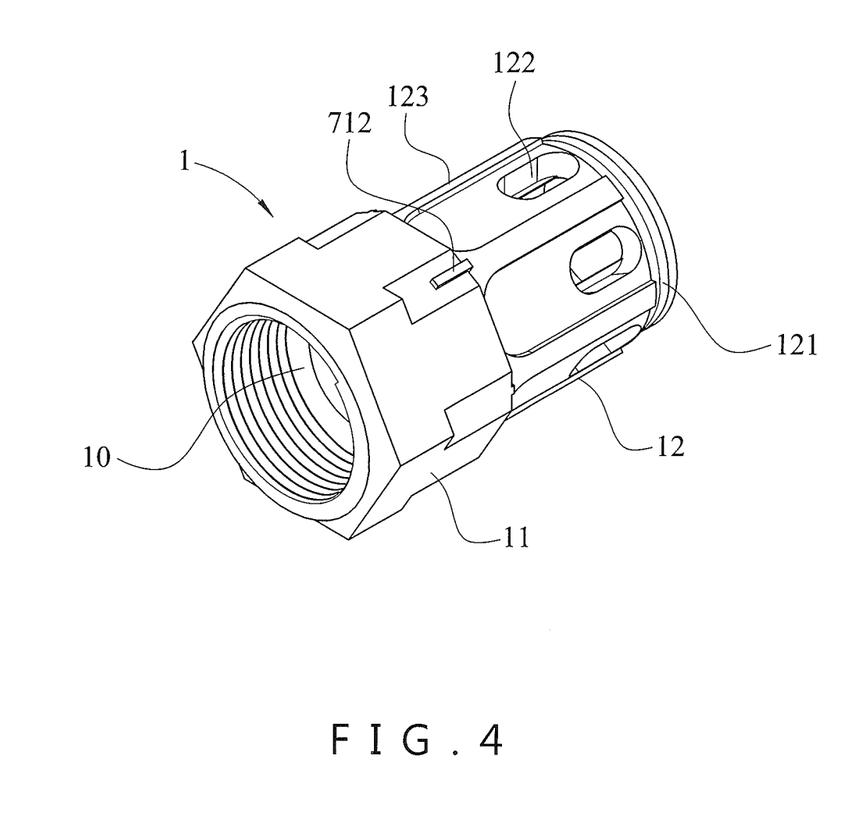
FIG. 4 is a perspective view of a connector body of the quick connector in accordance with another preferred embodiment of the present invention.

As shown in FIG. 4, the switching ring 71 of the locking structure 7 and the extension 12 of the connector body 1 are formed integrally. At this time, the two opposite guide rails 712 of the switching ring 71 are formed on an outer wall of the mounting portion 11 of the connector body 1.

Figure 5:
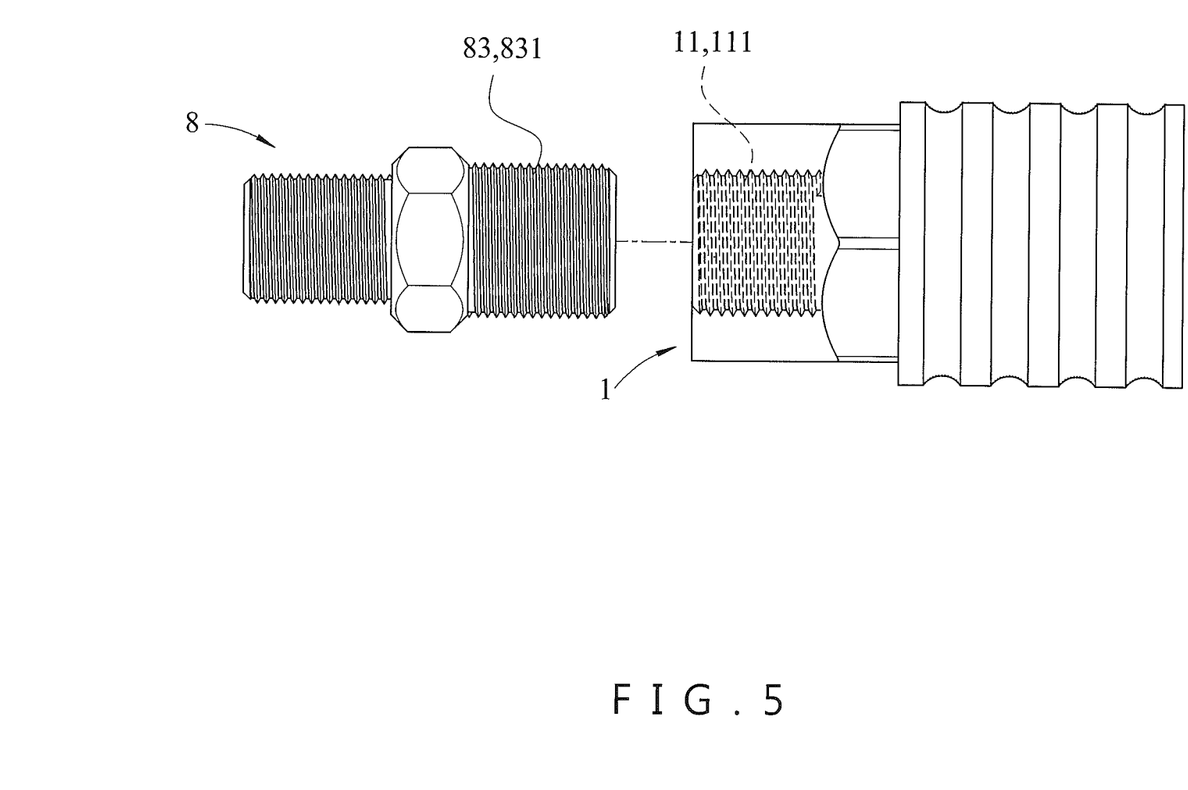
FIG. 5 is an exploded side view of a connector body and a connecting member of the quick connector in accordance with the preferred embodiment of the present invention.

In the preferred embodiment of the present invention, the quick connector further comprises a connecting member 8 connected with the connector body 1. The connecting member 8 is made of metallic or plastic material and has an interior provided with a through hole 80 extending through a whole length of the connecting member 8. The connecting member 8 has a first end provided with a first connecting portion 81 and a second end provided with a second connecting portion 83 mounted on the mounting portion 11 of the connector body 1. The first connecting portion 81 of the connecting member 8 is provided with an external thread 811. The connecting member 8 is provided with a fitting portion 82 located between the first connecting portion 81 and the second connecting portion 83. The fitting portion 82 of the connecting member 8 has a polygonal shape.

As shown in FIG. 5, the mounting portion 11 of the connector body 1 is provided with an internal thread 111, and the second connecting portion 83 of the connecting member 8 is provided with an external thread 831 screwed into the internal thread 111 of the mounting portion 11 of the connector body 1.

Figure 6:
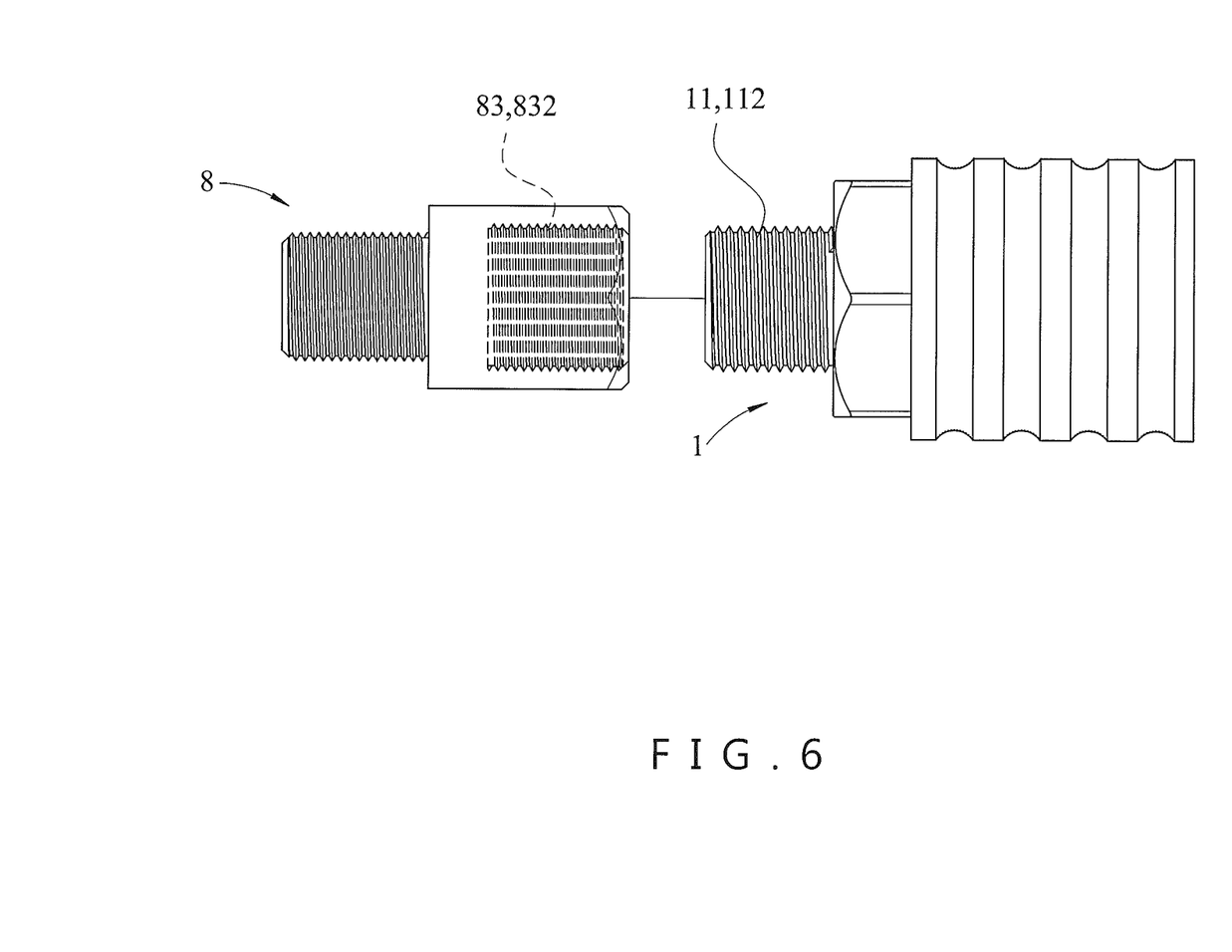
FIG. 6 is an exploded side view of a connector body and a connecting member of the quick connector in accordance with another preferred embodiment of the present invention.

As shown in FIG. 6, the mounting portion 11 of the connector body 1 is provided with an external thread 112, and the second connecting portion 83 of the connecting member 8 is provided with an internal thread 832 screwed onto the external thread 112 of the mounting portion 11 of the connector body 1.

In assembly, when the movable sleeve 5 is mounted on the extension 12 of the connector body 1, the two opposite ratchet modules 72 of the locking structure 7 arranged in the first mounting bore 52 of the movable sleeve 5 correspond to the switching ring 71 of the locking structure 7 arranged on the extension 12 of the connector body 1. Thus, the movable sleeve 5 is movable on the connector body 1 to push the push ring 4 and compress the spring 2.

In operation, referring to FIGS. 8-11 with reference to FIGS. 1-7, the movable sleeve 5 is driven forward by a force and moved toward the mounting portion 11 of the connector body 1 to push the push ring 4 and compress the spring 2 so as to release the positioning balls 3 from the push ring 4. Then, a coupling 9 is inserted into the chamber 10 from the extension 12 of the connector body 1. When the force applied on the movable sleeve 5 disappears, the movable sleeve 5 is moved backward by the restoring force of the spring 2, and the push ring 4 is pushed by the spring 2 to press the positioning balls 3, so that the coupling 9 is locked onto the extension 12 of the connector body 1 by the positioning balls 3.

Figure 8:
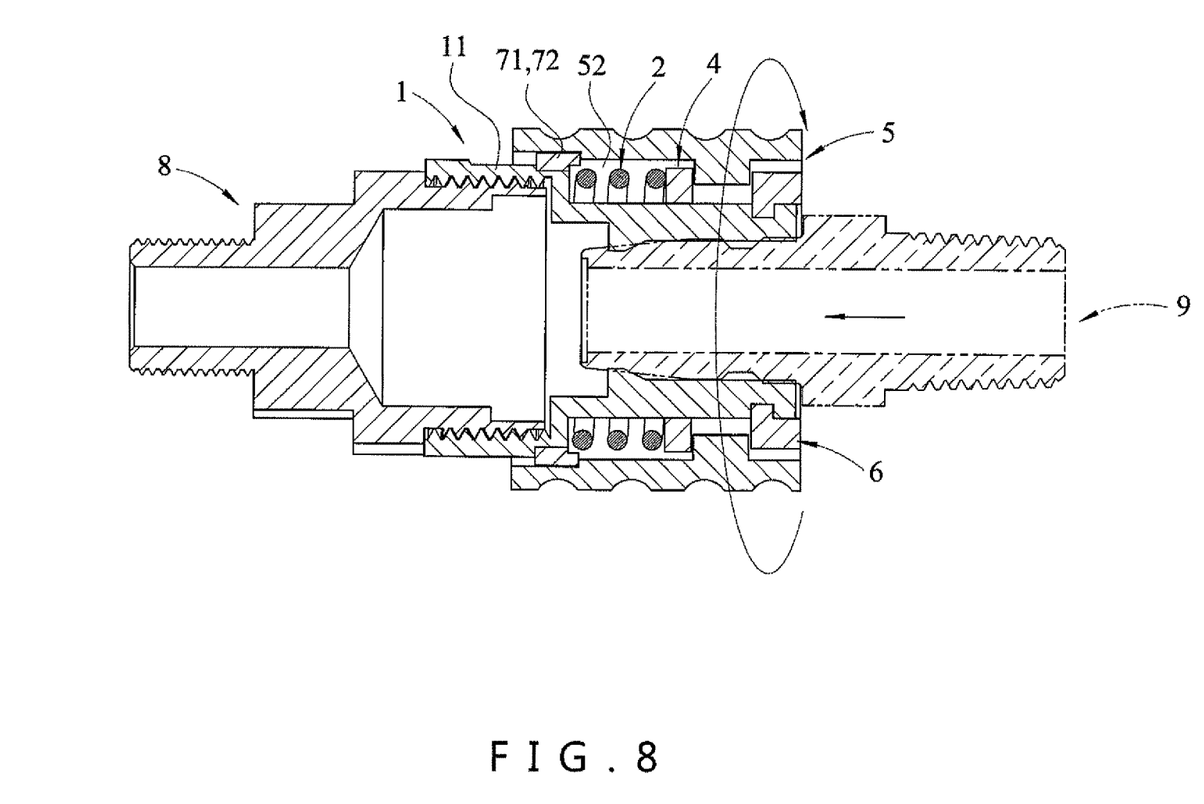
FIG. 8 is a schematic operational view of the quick connector as shown in FIG. 7.
Figure 9:
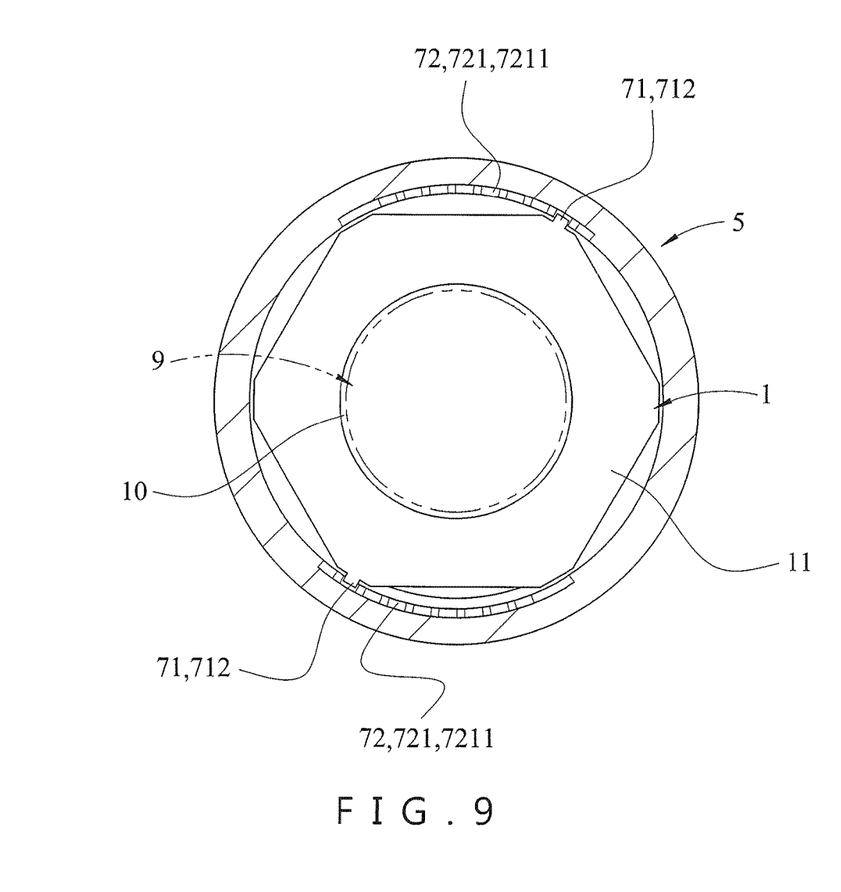
FIG. 9 is a side cross-sectional view of the quick connector as shown in FIG. 8.

When the movable sleeve 5 is rotated in one direction as shown in FIG. 8, the toothed braking portion 7211 of the stop zone 721 of each of the two opposite ratchet modules 72 is moved to align with each of the two opposite guide rails 712 of the switching ring 71 as shown in FIG. 9, so that the movable sleeve 5 is locked by the stop zone 721 of each of the two opposite ratchet modules 72 and cannot be moved to prevent the movable sleeve 5 from being moved due to an external force so as to prevent the coupling 9 from being unlocked by the movable sleeve 5 and detached from the extension 12 of the connector body 1.

Figure 10:
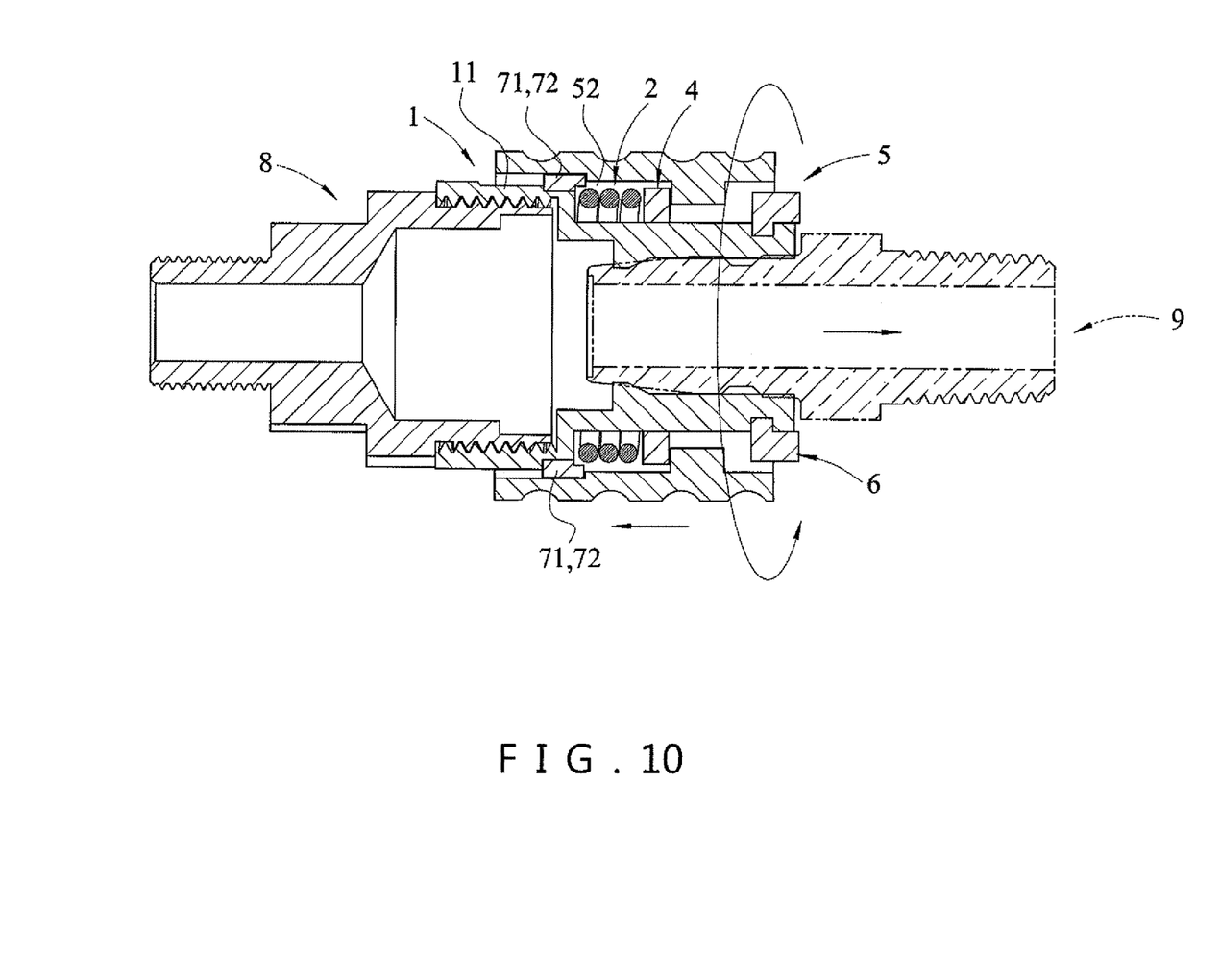
FIG. 10 is another schematic operational view of the quick connector as shown in FIG. 7.
Figure 11:
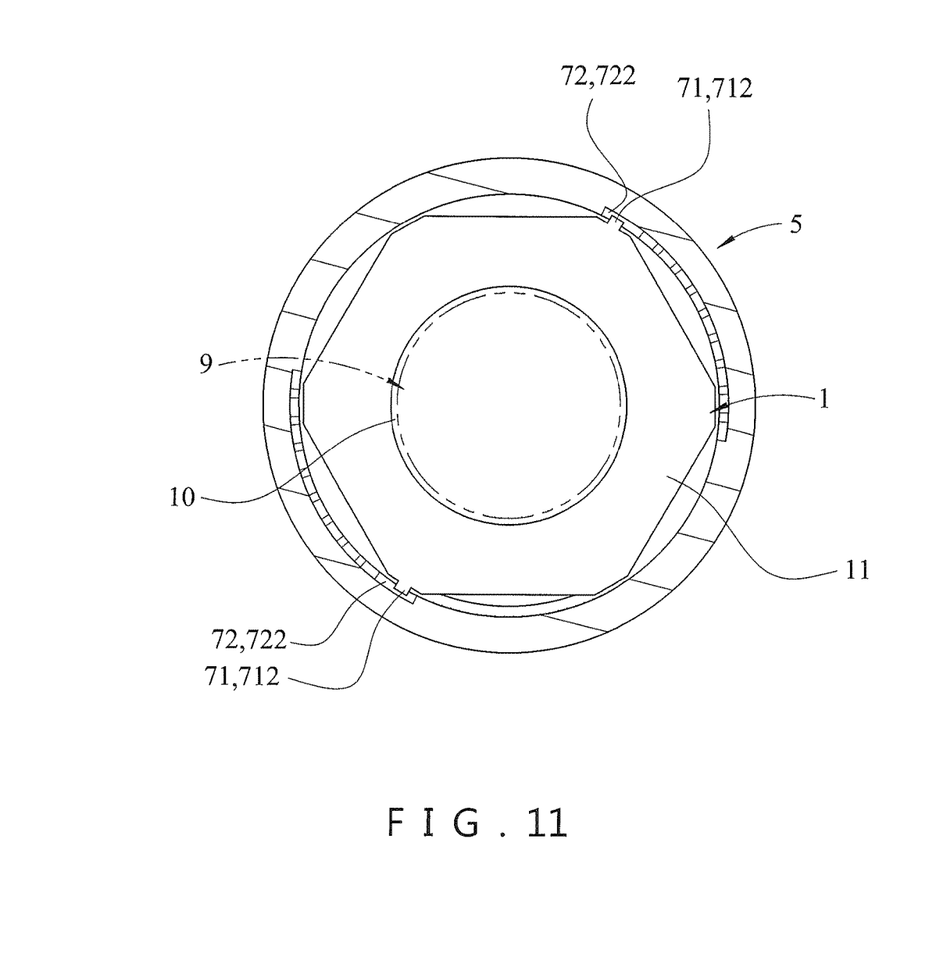
FIG. 11 is a side cross-sectional view of the quick connector as shown in FIG. 10.

On the contrary, when the movable sleeve 5 is rotated in the other direction as shown in FIG. 10, the free zone 722 of each of the two opposite ratchet modules 72 is moved to align with each of the two opposite guide rails 712 of the switching ring 71 as shown in FIG. 11, so that the movable sleeve 5 is unlocked and movable freely along the free zone 722 of each of the two opposite ratchet modules 72. In such a manner, the movable sleeve 5 is driven forward and moved toward the mounting portion 11 of the connector body 1 to push the push ring 4 and compress the spring 2 as shown in FIG. 10, so as to release the positioning balls 3 from the push ring 4 and to unlock the coupling 9 from the positioning balls 3, so that the coupling 9 can be detached from the extension 12 of the connector body 1.

Accordingly, the movable sleeve 5 is locked by the locking structure 7 and cannot be moved any more so that the movable sleeve 5 will not be driven inadvertently due to an external force and can press the positioning balls 3 to lock the coupling 9 solidly and stably so as to prevent the coupling 9 from being detached from the connector body 1 and to enhance the working safety of the quick connector. In addition, the user only needs to rotate the movable sleeve 5 to unlock the movable sleeve 5 from the locking structure 7 so that the movable sleeve 5 is released to detach the coupling 9 from the connector body 1 easily and quickly, thereby saving the user's time and energy.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A quick connector comprising:
    a connector body, a spring, a plurality of positioning balls, a push ring, a movable sleeve, a snap ring, and a locking structure;
    wherein:
    the connector body has an interior provided with a chamber;
    the connector body has a first end provided with a mounting portion and a second end provided with an extension;
    the extension of the connector body has a peripheral face provided with an annular groove, a plurality of receiving holes and a plurality of positioning ribs;
    the plurality of receiving holes of the connector body are connected to the chamber;
    the spring is mounted on the extension of the connector body and is biased between the extension of the connector body and the push ring;
    the plurality of positioning balls are received in the plurality of receiving holes of the connector body;
    the push ring has an interior provided with a mounting hole mounted on the extension of the connector body;
    the mounting hole of the push ring has a peripheral wall provided with a plurality of positioning channels corresponding to the plurality of positioning ribs of the connector body;
    the push ring is pushed by an elastic force of the spring to press the plurality of positioning balls;
    the movable sleeve is mounted on the extension of the connector body;
    the movable sleeve has an inner wall provided with a first mounting bore, a stop flange and a second mounting bore, with the stop flange being arranged between the first mounting bore and the second mounting bore;
    the first mounting bore of the movable sleeve receives the spring and the push ring;
    the snap ring is mounted on the extension of the connector body and retained by the annular groove of the connector body;
    the snap ring is received in the second mounting bore of the movable sleeve and abuts the stop flange of the movable sleeve;
    the locking structure includes a switching ring mounted on the extension of the connector body and two opposite ratchet modules mounted in a peripheral wall of the first mounting bore of the movable sleeve;
    the switching ring of the locking structure has an inner wall provided with a plurality of positioning recesses corresponding to peripheral corners of the mounting portion of the connector body, so that the switching ring of the locking structure is limited on the connector body;
    the switching ring of the locking structure has an outer wall provided with two opposite guide rails;
    each of the two opposite ratchet modules of the locking structure is provided with a stop zone and a free zone;
    the stop zone of each of the two opposite ratchet modules is provided a toothed braking portion;
    the free zone of each of the two opposite ratchet modules is connected to the stop zone and has an elongate shape; and
    when a coupling is inserted into the chamber from the extension of the connector body, and when the movable sleeve is rotated in one direction, the toothed braking portion of the stop zone of each of the two opposite ratchet modules is moved to align with each of the two opposite guide rails of the switching ring, so that the movable sleeve is locked by the stop zone of each of the two opposite ratchet modules.

2. The quick connector of claim 1, wherein when the movable sleeve is rotated in the other direction, the free zone of each of the two opposite ratchet modules is moved to align with each of the two opposite guide rails of the switching ring, so that the movable sleeve is unlocked and movable freely along the free zone of each of the two opposite ratchet modules.

3. The quick connector of claim 1, wherein the switching ring of the locking structure and the extension of the connector body are formed integrally.

4. The quick connector of claim 1, further comprising:
a connecting member connected with the connector body.

5. A quick connector comprising:
a connector body, a connecting member connected with the connector body, a spring, a plurality of positioning balls, a push ring, a movable sleeve, a snap ring, and a locking structure;

wherein:

the connector body has an interior provided with a chamber;

the connector body has a first end provided with a mounting portion and a second end provided with an extension;

the extension of the connector body has a peripheral face provided with an annular groove, a plurality of receiving holes and a plurality of positioning ribs;

the plurality of receiving holes of the connector body are connected to the chamber;

the spring is mounted on the extension of the connector body and is biased between the extension of the connector body and the push ring;

the plurality of positioning balls are received in the plurality of receiving holes of the connector body;

the push ring has an interior provided with a mounting hole mounted on the extension of the connector body;

the mounting hole of the push ring has a peripheral wall provided with a plurality of positioning channels corresponding to the plurality of positioning ribs of the connector body;

the push ring is pushed by an elastic force of the spring to press the plurality of positioning balls;

the movable sleeve is mounted on the extension of the connector body;

the movable sleeve has an inner wall provided with a first mounting bore, a stop flange and a second mounting bore, with the stop flange being arranged between the first mounting bore and the second mounting bore;

the first mounting bore of the movable sleeve receives the spring and the push ring;

the snap ring is mounted on the extension of the connector body and retained by the annular groove of the connector body;

the snap ring is received in the second mounting bore of the movable sleeve and abuts the stop flange of the movable sleeve;

the locking structure includes a switching ring mounted on the extension of the connector body and two opposite ratchet modules mounted in a peripheral wall of the first mounting bore of the movable sleeve;

the switching ring of the locking structure has an inner wall provided with a plurality of positioning recesses corresponding to peripheral corners of the mounting portion of the connector body, so that the switching ring of the locking structure is limited on the connector body;

the switching ring of the locking structure has an outer wall provided with two opposite guide rails;

each of the two opposite ratchet modules of the locking structure is provided with a stop zone and a free zone;

the stop zone of each of the two opposite ratchet modules is provided a toothed braking portion;

the free zone of each of the two opposite ratchet modules is connected to the stop zone and has an elongate shape;

the connecting member has an interior provided with a through hole;

the connecting member has a first end provided with a first connecting portion and a second end provided with a second connecting portion mounted on the mounting portion of the connector body;

the first connecting portion of the connecting member is provided with an external thread;

the connecting member is provided with a fitting portion located between the first connecting portion and the second connecting portion; and the fitting portion of the connecting member has a polygonal shape.

6. The quick connector of claim 5, wherein the mounting portion of the connector body and the second connecting portion of the connecting member are connected by the external thread and an internal thread of the second connecting portion.

7. The quick connector of claim 5, wherein each of the plurality of positioning balls is a steel ball.

* * * * *